US011855549B2

(12) United States Patent
Vinson et al.

(10) Patent No.: US 11,855,549 B2
(45) Date of Patent: Dec. 26, 2023

(54) METHOD AND DEVICE FOR MONITORING THE HYBRIDIZATION OF AN AIRCRAFT

(71) Applicants: SAFRAN, Paris (FR); SAFRAN ELECTRICAL & POWER, Blagnac (FR); SAFRAN HELICOPTER ENGINES, Bordes (FR)

(72) Inventors: Garance Vinson, Blagnac (FR); Florent Rougier, Moissy-Cramayel (FR); Stéphane Meyer Beddok, Moissy-Cramayel (FR)

(73) Assignees: SAFRAN, Paris (FR); SAFRAN ELECTRICAL & POWER, Blagnac (FR); SAFRAN HELICOPTER ENGINES, Bordes (FR)

( * ) Notice: Subject to any disclaimer, the term of this patent is extended or adjusted under 35 U.S.C. 154(b) by 154 days.

(21) Appl. No.: 17/594,288

(22) PCT Filed: Mar. 20, 2020

(86) PCT No.: PCT/FR2020/050614
§ 371 (c)(1),
(2) Date: Oct. 8, 2021

(87) PCT Pub. No.: WO2020/208326
PCT Pub. Date: Oct. 15, 2020

(65) Prior Publication Data
US 2022/0166335 A1    May 26, 2022

(30) Foreign Application Priority Data
Apr. 11, 2019  (FR) ...................................... 1903879

(51) Int. Cl.
*H02M 5/458*    (2006.01)
*B64D 27/24*    (2006.01)
(Continued)

(52) U.S. Cl.
CPC ........... *H02M 5/4585* (2013.01); *B60L 50/15* (2019.02); *B64D 27/24* (2013.01); *H02J 3/36* (2013.01);
(Continued)

(58) Field of Classification Search
None
See application file for complete search history.

(56) References Cited

U.S. PATENT DOCUMENTS 10,589,635 B1 *  3/2020  Solodovnik ........... H02J 7/1415
2010/0064689 A1   3/2010  Reinhardt
(Continued)

FOREIGN PATENT DOCUMENTS

CN    101165988 A    4/2008
CN    101674985 A    3/2010
(Continued)

OTHER PUBLICATIONS

International Search Report issued in International Application PCT/FR2020/050614 dated Jul. 2, 2020 (3 pages).
(Continued)

*Primary Examiner* — Jared Fureman
*Assistant Examiner* — Aqeel H Bukhari
(74) *Attorney, Agent, or Firm* — Bookoff McAndrews, PLLC

(57) ABSTRACT

Method for monitoring the distribution of power in a hybrid propulsion system comprising one or more electrical sources delivering an AC voltage, each of which is associated with an AC-to-DC controlled rectifier and one or more batteries, wherein, the AC-to-DC controlled rectifier and the battery each being connected directly to an HVDC bus supplying one or more electrical loads with power, the monitoring of the distribution of power is performed through the individual AC-to-DC controlled rectifier by a feedback loop to a power (Continued)

setpoint (Pref) on the basis of a measured power of the battery (Pbat) and a feedback loop to a voltage setpoint (Vref) on the basis of a measured voltage of the HVDC bus ($V_{HVDC}$), either one of these two feedback loops delivering an RMS current setpoint Idref and Iqref for a feedback loop on the basis of a current (Igen) of the electrical source delivering an AC voltage.

8 Claims, 3 Drawing Sheets

(51) Int. Cl.
*H02J 3/36* (2006.01)
*B60L 50/15* (2019.01)
*B64D 27/02* (2006.01)

(52) U.S. Cl.
CPC ..... *B60L 2200/10* (2013.01); *B64D 2027/026* (2013.01); *B64D 2221/00* (2013.01); *H02J 2310/44* (2020.01)

(56) References Cited

U.S. PATENT DOCUMENTS

| | | | |
|---|---|---|---|
| 2010/0090629 A1* | 4/2010 | Tang | B60L 15/2045 |
| | | | 180/65.285 |
| 2012/0101671 A1 | 4/2012 | Caouette | |
| 2014/0132062 A1 | 5/2014 | Brombach et al. | |
| 2015/0075167 A1 | 3/2015 | Caouette | |
| 2016/0137304 A1 | 5/2016 | Phan et al. | |
| 2018/0009529 A1 | 1/2018 | Phan et al. | |
| 2018/0022461 A1 | 1/2018 | Nunes et al. | |
| 2020/0231293 A1* | 7/2020 | Parsons | F02K 3/06 |

FOREIGN PATENT DOCUMENTS

| | | |
|---|---|---|
| EP | 2720340 A1 | 4/2014 |
| TW | 200935641 A | 8/2009 |

OTHER PUBLICATIONS

Search Report issued in French Application FR1903879 dated Dec. 2, 2019 (2 pages).

\* cited by examiner

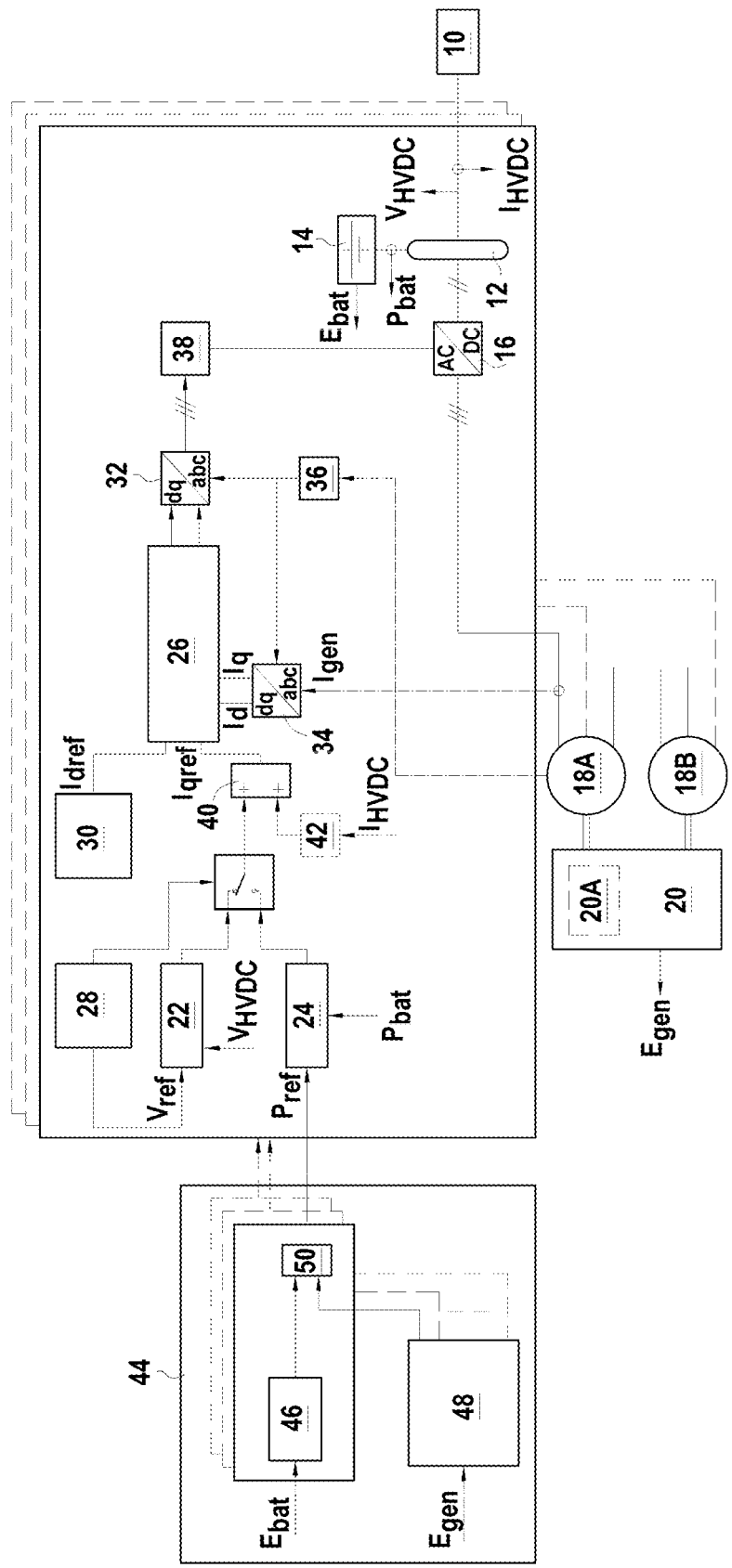
[Fig. 1]

[Fig. 2]
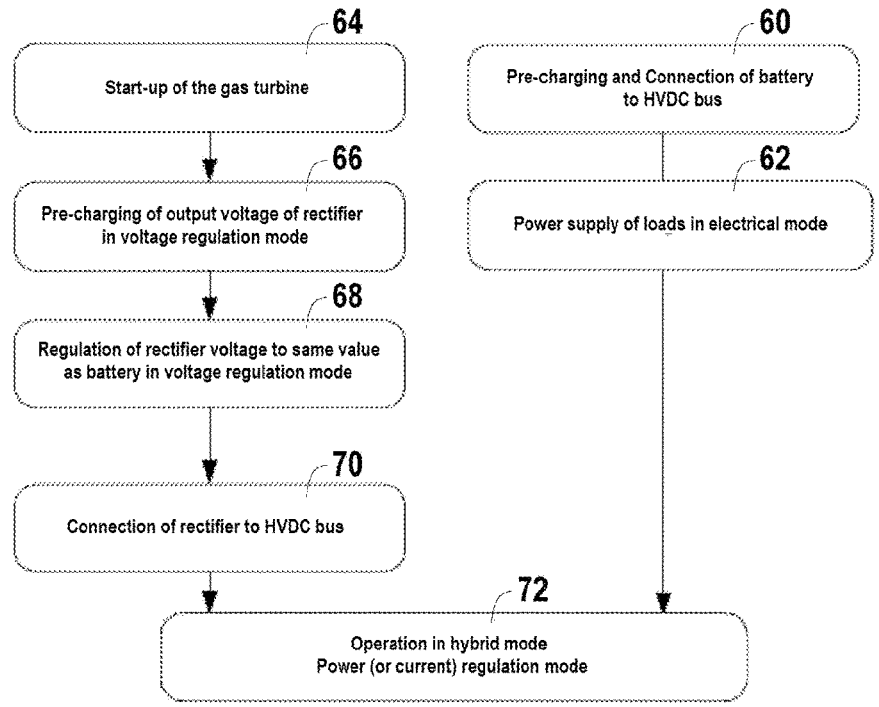
[Fig. 3]
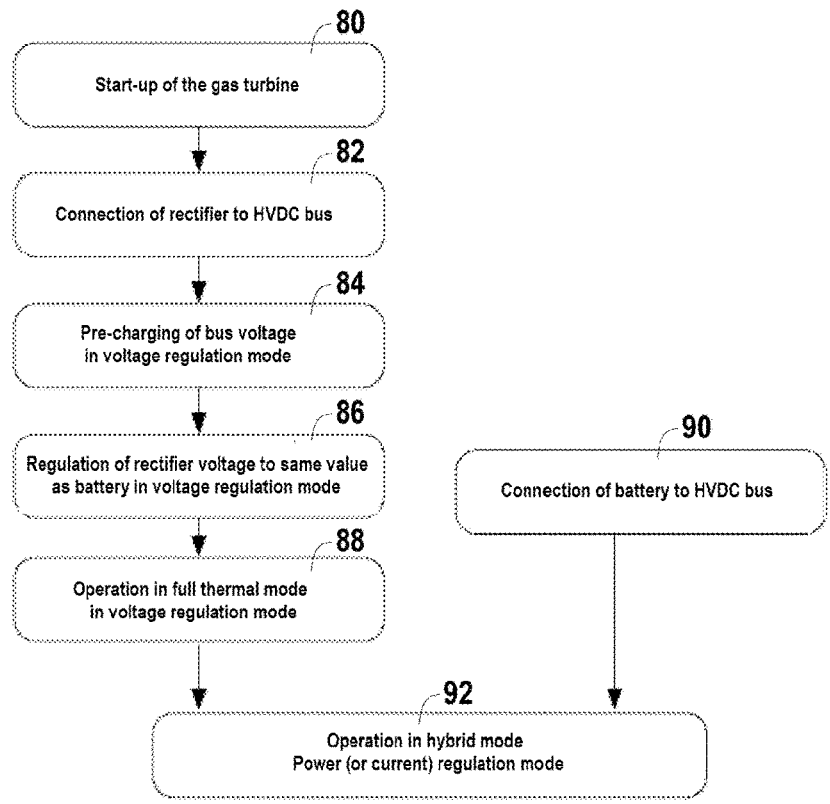

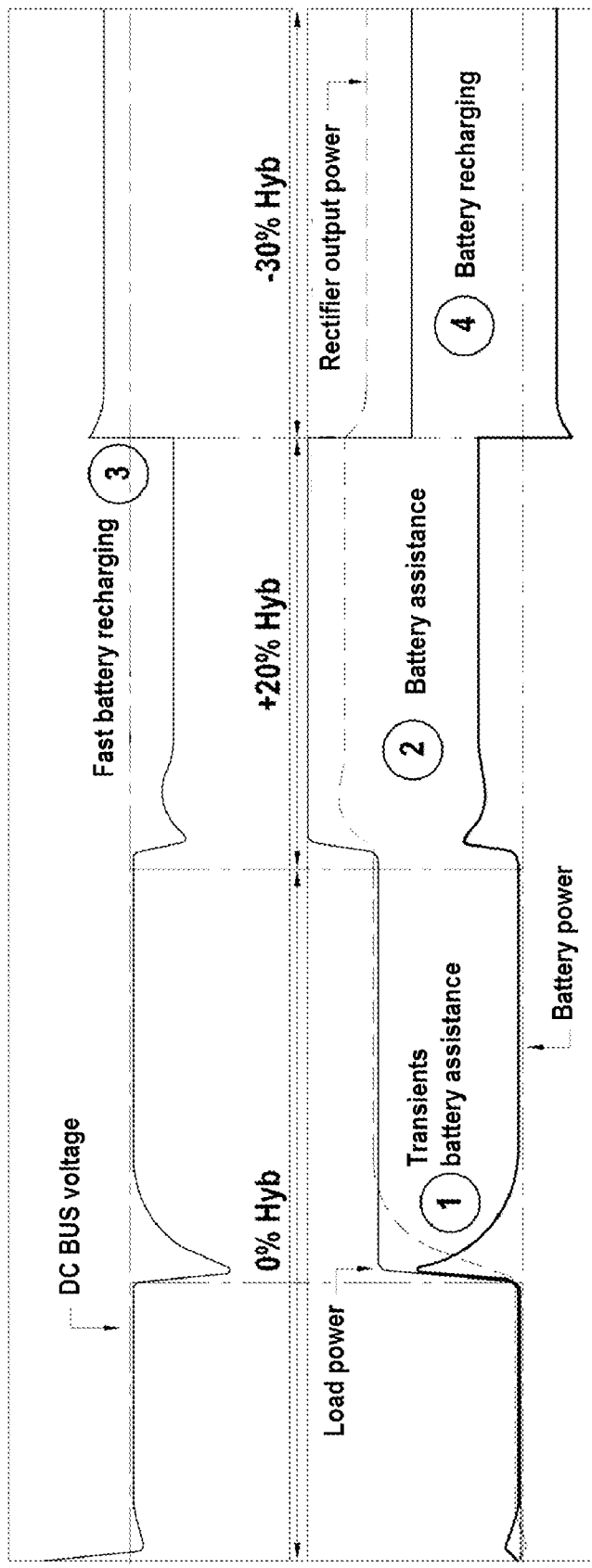
[Fig. 4]

METHOD AND DEVICE FOR MONITORING THE HYBRIDIZATION OF AN AIRCRAFT

CROSS-REFERENCE TO RELATED APPLICATION(S)

This application is the U.S. national phase entry under 35 U.S.C. § 371 of International Application No. PCT/FR2020/050614, filed on Mar. 20, 2020, which claims priority to French Patent Application No. 1903879, filed on Apr. 11, 2019.

TECHNICAL FIELD

The invention pertains to hybrid propulsion systems for aircraft, more specifically for craft with Vertical Take-Off and Landing (VTOL), and it concerns a system for controlling the power distribution between electrical power sources as a function of the different ratings of the aircraft.

BACKGROUND

VTOL tend to be used as a form of intra-urban and inter-urban transport suitable for delivering goods or transferring people and for which there is high demand for hybrid propulsion systems, preferably integrated, due to the as yet limited autonomy of current batteries.

In such a hybrid propulsion system, there are two electrical power sources, a turbo generator and a set of batteries, powering one or more electrical loads, in fact one or more electrical motors, via one or more DC power buses (HVDC buses). The role of the batteries is to supplement the turbo generator at operating points in which it cannot meet the demands of the loads (transient or constant) on its own, thus avoiding overdimensioning or overloading the turbo generator.

The maximum power of the turbo generator depends on the temperature and elevation, and is dynamically limited. The advantage of the batteries is due to the fact that the power can be supplied by the battery with a faster dynamic performance than the power supplied by the turbo generator in the event of a quick power draw.

Conventionally, such a hybrid propulsion system includes several ratings:
- a startup rating of the turbo generator and precharging of the buses (in which the power supplied to the DC bus must be limited until the capacitors are pre charged),
- a hybrid rating in which both sources supply power,
- an electrical rating (on setpoint or in the event of loss of the turbo generator) where only the battery supplies power, and
- a thermal rating (on setpoint or in the event of loss of the battery) where only the turbo generator provides power.

FIG. 4 more precisely illustrates the hybrid rating covering four different situations:
- in 1), the battery supplies the high dynamic performances (during charging and discharging) which are not covered by the turbo generator,
- in 2), the battery supplies the power surplus when the turbo generator is at its power limit,
- in 3), there is a load peak on the battery to compensate for the quick drop in load (the turbo generator remains at high power since its dynamic performance is slow, so this power which is no longer used by the electrical loads goes into the battery, until the power of the turbo generator is equivalent to the power requested by the electrical loads), and
- in 4) the turbo generator charges the battery.

This taking into account of the different ratings requires control of the hybrid propulsion system to manage the power distribution between the two electrical sources.

On current systems, this control of the hybridization is done via the control of the current of the battery through the DC/DC converter connecting this battery to the HVDC bus when the rectifiers at the generator output of the turbo generator are not controlled or through both this DC/DC converter and the AC/DC rectifier when the latter is controlled, seeking the local optima.

However, this seeking of optima has proven particularly difficult and there is therefore a need for a system for controlling the AC hybridization.

SUMMARY OF THE INVENTION

The invention thus has the aim of making provision for the control of the hybridization of a hybrid propulsion system that is less complex and more efficient, more modular and more scalable while also allowing optimized integration and installation on the aircraft. Another aim of the invention is to allow control modes for both current and voltage, to adapt to the different flight phases and to the different operating points. Yet another aim is to make it possible to meet the requirements of the different uses, both thermal, electrical or hybrid, of the propulsion system.

These aims are achieved with a method for controlling the power distribution in a hybrid propulsion system including an electrical power source delivering an AC voltage associated with a controlled AC/DC rectifier and a battery, a method characterized in that the controlled AC/DC rectifier and the battery are each directly connected to an HVDC DC bus powering at least one electrical load, the control of the power distribution is performed through the controlled AC/DC rectifier on its own by a regulation loop on a power setpoint based on a measured power of the battery and a regulation loop on a voltage setpoint based on a measured voltage of the HVDC bus, these two regulation loops each delivering a quadratic current setpoint for a regulation loop based on a current of the electrical power source delivering an AC voltage.

This configuration dispenses with the DC/DC converter between the battery and the HVDC bus, the battery being thus controlled indirectly.

Advantageously, the quadratic current setpoint Iqref is selectively delivered by one or the other of the two regulation loops on the power or voltage setpoints, according to a hybrid rating of the hybrid propulsion system for one of them and one of the thermal or startup ratings of the hybrid propulsion system for the other. In the same way, the quadratic current setpoint Idref is delivered by a flux management module.

Preferably, the quadratic current setpoint Iqref delivered to the regulation loop is previously summed by a current value equivalent to an estimate of the power consumed by the at least one electrical load.

Advantageously, the voltage setpoint is delivered by a power manager and defines the voltage to be applied to the at least one electrical load.

Preferably, the power setpoint is delivered by a hybridization assembly and defines the desired power distribution between the at least one electrical power source delivering an AC voltage and the at least one battery.

The invention also concerns a device for controlling the power distribution implementing the aforementioned method, the hybrid propulsion system comprising such a power-distribution-controlling device and an aircraft, particularly with VTOL, comprising such a hybrid propulsion system.

BRIEF DESCRIPTION OF THE DRAWINGS

Other features and advantages of this invention will become apparent from the detailed description given below, with reference to the following figures without any limitation and in which:

FIG. 1 illustrates an architecture for controlling the hybridization in an aircraft for the implementation of the power distribution method according to this invention, FIG. 2 is a flow chart showing the steps of the method in a first operating configuration, FIG. 3 is a flow chart showing the steps of the method in a second operating configuration, FIG. 4 shows the variation in the load of the battery, of the power of the electrical power source and of the total power of the load in a hybridization controlling architecture of the prior art.

DESCRIPTION OF THE EMBODIMENTS

According to the invention, the control of the hybridization is done by controlling the voltage, the power (or the output current) of one or more controlled AC/DC rectifiers, (i.e. active rectifiers) and not as conventionally through a DC/DC converter disposed between the battery and the HVDC DC bus. The power of the battery is thus controlled indirectly by one or more active rectifiers.

FIG. 1 shows an architecture allowing this control of the hybridization in a hybrid propulsion system intended to supply at least one propulsion unit 10 from at least one HVDC DC bus 12 to which are connected at least one battery 14 and at least one controlled AC/DC rectifier 16. The active rectifier(s) 16 is/are assembled at the output of one or more electrical power sources 18A, 18B delivering an AC voltage and to which these active rectifiers are associated to convert it into a DC voltage. This electrical power source may be a simple power generator, a RAT, an APU or a turbo generator equipped with a gas turbine 20 (the control unit or FADEC 20A of which is illustrated in dotted lines).

According to the invention, the control of the power distribution in this hybrid propulsion system is provided through the controlled AC/DC rectifier 16 by a command including three regulation loops making it possible to meet all the ratings of the hybrid propulsion system: a first voltage regulation loop 22 on a voltage setpoint Vref based on the measurement of the voltage of the HVDC bus $V_{HVDC}$, a second power control loop 24 on a power setpoint Pref based on a measurement of the power of the battery Pbat, and a third local current regulation loop 26 on a quadratic current setpoint Idref, Iqref based on a measurement of the current of the AC electrical power source Igen.

The voltage and power regulation loops are used selectively according to the rating of the hybrid propulsion system. Thus, the voltage regulation is used at startup for the precharging of the HVDC DC bus 12 and in batteryless mode (thermal rating), and the power regulation is used in the hybrid rating. The selection of one or the other of these two forms of regulation as a function of the desired rating is made by a power manager 28 which also delivers the voltage setpoint Vref.

Note that the presence of the two regulation loops 22 and 24, the selection of which is made by the power manager 28, makes it possible to manage a battery loss or a loss of the AC electrical power source (turbo generator for example) very simply by changing from the power regulation mode enabled in the hybrid rating to the voltage regulation mode enabled in the thermal or all-electrical ratings.

The output of the regulation loop (voltage or power) generates a part of the quadratic current torque setpoint Iqref which is sent to the current regulation loop 26, the other part of the flux quadratic current setpoint Idref being output from a flux management module 30. This current loop is single and is used at the output of the voltage loop 22 and the power loop 24 alike to provide vector control of the controlled AC/DC rectifier 16. The latter being voltage-controlled, the quadratic current must be converted into a three-phase voltage by an appropriate converting module 32 just like the three-phase current Igen from the AC electrical power source and converted into quadratic current Id, Iq by a corresponding converting module 34. The synchronization of the conversions is done as a function of the position of the AC source supplied by an appropriate module 36. Finally, a modulating module 38 applies the required vector command.

Note that an adder 40 may be added once the selection of the rating has been made by the power manager 28, to sum the current setpoint with a current value equivalent to an estimate of the power consumed by the load(s) 10 before it is sent into the current regulation loop 22. This current value constitutes an optional load compensation which may be deducted from the measurement of the current $I_{HVDC}$ of the HVDC DC bus 12 in an appropriate compensating module 42. This allows the active rectifier 16 to be more responsive, and therefore to relieve the battery 14.

The power setpoint Pref comes from a hybridization assembly 44 the function of which is to determine the hybridization rate, i.e. the power to be supplied by the battery and the power to be supplied by the turbo generator. This hybridization assembly knows the charge state of the battery Ebat and the state of the powers available for the AC voltage electrical power source (turbo generator or other) Egen and can therefore define in appropriate modules 46, 48 both a battery power to guarantee the charge state of the battery and the power that the battery must supply as a function of the power supply capability of the gas turbine (in the case of a turbo generator for example) and therefore provide the desired power distribution between the two. It also defines in a threshold module 50 some minimum and maximum power thresholds of the battery, for example by not asking it for too much or too little power. If there are several HDVC DC buses on the same AC voltage electrical power source, this hybridization assembly also allocates to each HVDC DC bus the minimum and maximum power per HVDC DC bus.

FIGS. 2 and 3 show two flow charts illustrating the method of the invention.

In FIG. 2, the battery is connected to the HVDC DC bus first, then the AC electrical power source is connected to the HVDC DC bus which has therefore already been precharged by the battery. More precisely, in a first step 60, the precharging and connection of the battery 14 to the HVDC DC bus 12 is performed. The hybrid propulsion system is then in a following step 62 able to operate in a load supply power rating. Next, in a step 64, the gas turbine 20 is started. In a following step 66 there is a precharging of the voltage of the controlled AC/DC rectifier 16 in voltage regulation mode and in a step 68, still in voltage regulation mode, there is a regulation of the voltage of the controlled AC/DC rectifier 16 to an identical value to that of the battery 14. Once the controlled AC/DC rectifier 16 is connected to the HVDC DC bus 12 in a following step 70, operation in the hybrid rating in the power regulation mode is then possible in a final step 72.

In FIG. 3, the AC voltage electrical power source is connected to the HVDC DC bus first, then the battery is connected to the HVDC DC bus which has therefore already been precharged by this AC voltage electrical power source. More precisely, in a first step 80 the gas turbine 20 is started and the controlled AC/DC rectifier 16 is connected to the HVDC DC bus 12 in a step 82. In a following step 84 there is a precharging of the voltage of the HVDC DC bus in voltage regulation mode and in a step 86, still in voltage regulation mode, there is a regulation of the voltage of the controlled AC/DC rectifier 16 to a value identical to that of the battery 14. The hybrid propulsion system is then in a following step 88 able to operate in the thermal rating. Once the battery is connected to the HVDC DC bus in a step 90, operation in the hybrid rating in power regulation mode is then possible in a final step 92.

Thus, with the present invention, it is possible to:
- manage power distribution by defining what power comes from the AC voltage electrical power source (for example a turbo generator), and what power comes from the batteries, and the control of the electrical power sources by checking that the power setpoint defined by this distribution is indeed being applied,
- adapt to the different ratings of the hybrid propulsion system (thermal, electrical, hybrid),
- adapt to the power and energy supply capabilities of the two sources and to the power requirements of the electrical loads (propulsion units),
- offer a scalable hybrid solution that can meet different requirements (serial hybrid, parallel hybrid, full or partial system, centralized or segregated systems etc.) and keep up with changes to battery capacity,
- offer a weight-optimized hybridization solution,
- offer as simple a hybridization solution as possible (in terms of number of modules, logic etc.),
- optimize reliability.

The invention claimed is:

1. A method for controlling the power distribution in a hybrid propulsion system including at least one electrical power source delivering an AC voltage associated with a controlled AC/DC rectifier and at least one battery, wherein the controlled AC/DC rectifier and the battery are each directly connected to an HVDC DC bus powering at least one electrical load, the control of the power distribution is performed through the controlled AC/DC rectifier on its own by a regulation loop on a power setpoint based on a measured power of the battery and a regulation loop on a voltage setpoint based on a measured voltage of the HVDC bus, one or the other of these two regulation loops each delivering a quadratic current setpoint Idref and Igref for a regulation loop based on a current of the electrical power source delivering an AC voltage, wherein the quadratic current setpoint Igref is selectively delivered by one or the other of the two regulation loops on the power or voltage setpoints, according to a hybrid rating of the hybrid propulsion system for one of them and one of the thermal or start-up ratings of the hybrid propulsion system for the other.

2. The method as claimed in claim 1, wherein the quadratic current setpoint Iqref delivered to the regulation loop is previously summed by a current value equivalent to an estimate of the power consumed by said at least one electrical load.

3. The method as claimed in claim 1, wherein the quadratic current setpoint Idref is delivered by a flux management module.

4. The method as claimed in claim 1, wherein the voltage setpoint is delivered by a power manager and defines the voltage to be applied to the at least one electrical load.

5. The method as claimed in claim 1, wherein the power setpoint is delivered by a hybridization assembly and defines the desired power distribution between the at least one electrical power source delivering an AC voltage and the at least one battery.

6. A device for controlling the power distribution between an electrical power source delivering an AC voltage associated with a controlled AC/DC rectifier and a battery, the controlled AC/DC rectifier and the battery each being directly connected to an HVDC DC bus powering at least one electrical load, wherein the device is configured to perform the control of the power distribution through the controlled AC/DC rectifier by a regulation loop on a power setpoint based on a measured power of the battery and a regulation loop on a voltage setpoint based on a measured voltage of the HVDC bus, one or the other of these two regulation loops each delivering a quadratic current setpoint Idref and Igref for a regulation loop based on a current of the electrical power source delivering an AC voltage, wherein the quadratic current setpoint Igref is selectively delivered by one or the other of the two regulation loops on the power or voltage setpoints, according to a hybrid rating of the hybrid propulsion system for one of them and one of the thermal or start-up ratings of the hybrid propulsion system for the other.

7. A hybrid propulsion system comprising a device for controlling power distribution as claimed in claim 6.

8. An aircraft of VTOL Vertical Take-Off and Landing type comprising a hybrid propulsion system as claimed in claim 7.

* * * * *